(12) United States Patent
Green et al.

(10) Patent No.: US 7,645,139 B1
(45) Date of Patent: Jan. 12, 2010

(54) MATH TEACHING SYSTEM

(76) Inventors: Gloria A. Green, 791 Coleman St., Atlanta, GA (US) 30310; Denise Bailey Revels, 791 Coleman St., Atlanta, GA (US) 30310; Tyree Wilkins, 791 Coleman St., Atlanta, GA (US) 30310

( * ) Notice: Subject to any disclaimer, the term of this patent is extended or adjusted under 35 U.S.C. 154(b) by 514 days.

(21) Appl. No.: 11/413,342

(22) Filed: May 1, 2006

(51) Int. Cl.
*G09B 1/00* (2006.01)
(52) U.S. Cl. .................................................. 434/209
(58) Field of Classification Search ................. 434/188, 434/190, 191, 192, 193, 196, 205, 208, 209
See application file for complete search history.

(56) References Cited

U.S. PATENT DOCUMENTS

| | | | | |
|---|---|---|---|---|
| 1,694,405 A * | 12/1928 | Troidl | ......................... | 434/203 |
| 2,971,275 A * | 2/1961 | Provenzano | ................. | 434/191 |
| 3,192,650 A * | 7/1965 | Torchia | ....................... | 434/209 |
| 3,267,590 A * | 8/1966 | Browning | .................... | 273/272 |
| 3,514,873 A * | 6/1970 | Stobbe | ........................ | 434/190 |
| D252,033 S | 6/1979 | Restaino | | |
| 4,373,917 A * | 2/1983 | Jackson | ........................ | 434/209 |
| 4,808,111 A * | 2/1989 | Pratt | ............................ | 434/191 |
| 4,884,973 A * | 12/1989 | Pak | .............................. | 434/191 |
| 5,149,102 A | 9/1992 | McGowan et al. | | |
| 5,338,203 A * | 8/1994 | Rheams | ........................ | 434/208 |
| 5,366,226 A | 11/1994 | McGowan et al. | | |
| 5,492,325 A | 2/1996 | Hawver | | |
| 5,772,209 A | 6/1998 | Thompson | | |
| 5,865,627 A * | 2/1999 | Foresman | .................... | 434/193 |
| 6,196,847 B1 * | 3/2001 | Karunamuni | ............... | 434/188 |
| 6,199,864 B1 | 3/2001 | Branner | | |
| 7,273,375 B2 * | 9/2007 | Wolf et al. | ................... | 434/188 |

* cited by examiner

*Primary Examiner*—Kurt Fernstrom

(57) ABSTRACT

A math teaching system for teaching a student how to solve an equation includes a base panel being mountable to a support surface. A work panel is coupled to an exterior surface of the base panel. The work panel has equation indicia positioned on an outer surface of the work panel opposite of the base panel. The equation indicia are used to learn to execute and determine an answer to a base equation. Each of a plurality of number tiles has a number indicia positioned on a top surface thereof. The number indicia of each of the number tiles is equal to a single digit number. Each of the tiles is positionable on the equation indicia of the work panel.

6 Claims, 6 Drawing Sheets

FIG. 5

MATH TEACHING SYSTEM

BACKGROUND OF THE INVENTION

1. Field of the Invention

The present invention relates to math games and more particularly pertains to a new math game for teaching a student how to solve a mathematical equation.

2. Description of the Prior Art

The use of math games is known in the prior art. The prior art commonly teaches the use of numbers on a surface and requiring a student to manipulate the numbers to solve equations that are provided through an alternate source.

While these devices fulfill their respective, particular objectives and requirements, the need remains for a system that has certain improved features that teach a student to break down a base equation into component equations. Additionally, the system teaches how the answers to the component equations relative to the base equation

SUMMARY OF THE INVENTION

The present invention meets the needs presented above by generally comprising a base panel being mountable to a support surface. A work panel is coupled to an exterior surface of the base panel. The work panel has equation indicia positioned on an outer surface of the work panel opposite of the base panel. The equation indicia are used to learn to execute and determine an answer to a base equation. Each of a plurality of number tiles has a number indicia positioned on a top surface thereof. The number indicia of each of the number tiles is equal to a single digit number. Each of the tiles is positionable on the equation indicia of the work panel.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a front view of the table panel of the present invention.

DESCRIPTION OF THE PREFERRED EMBODIMENT

Figure 1:
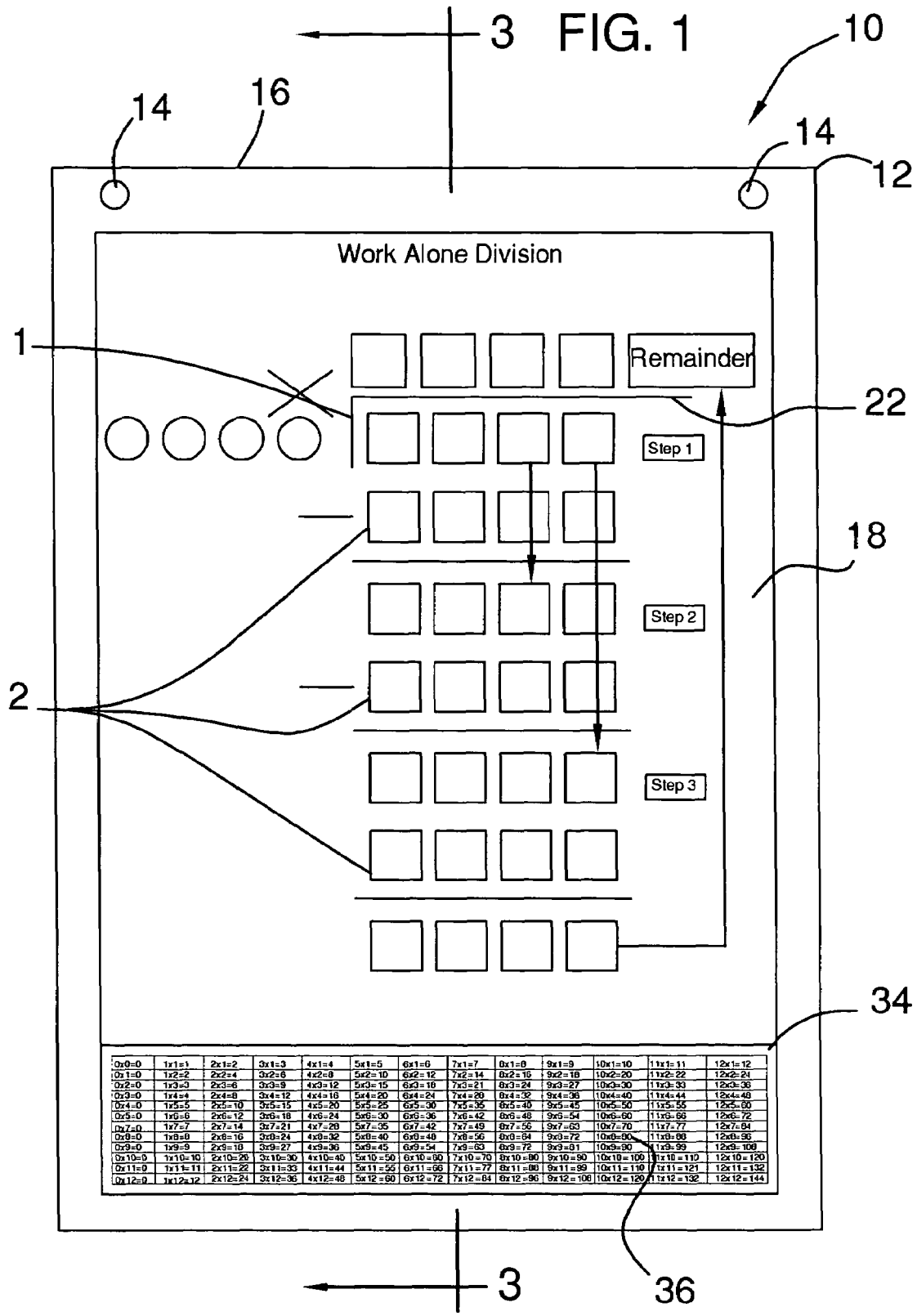
FIG. 1 is a front view of a math teaching system according to the present invention.
Figure 2:
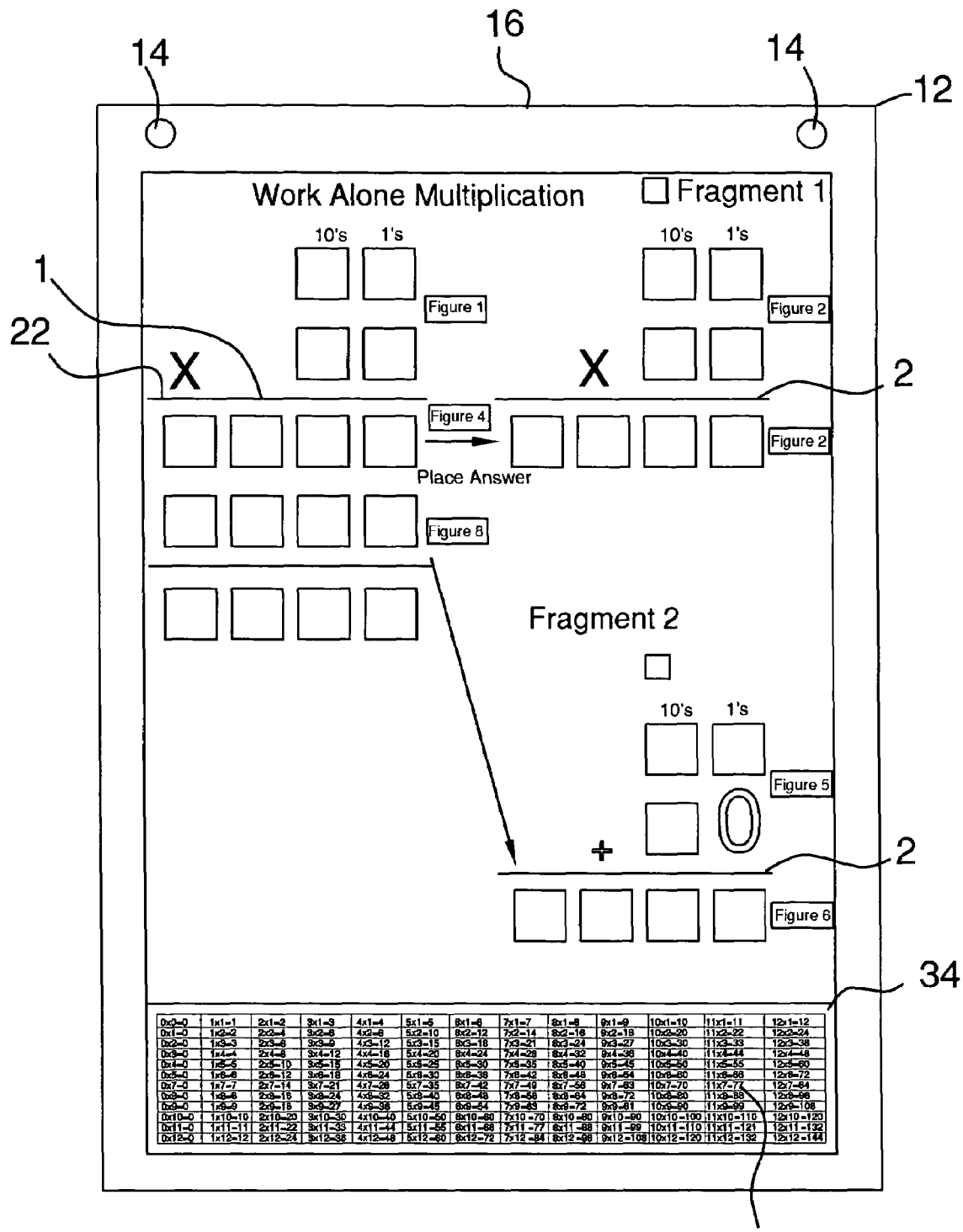
FIG. 2 is a front view of an embodiment of the present invention.
Figure 3:
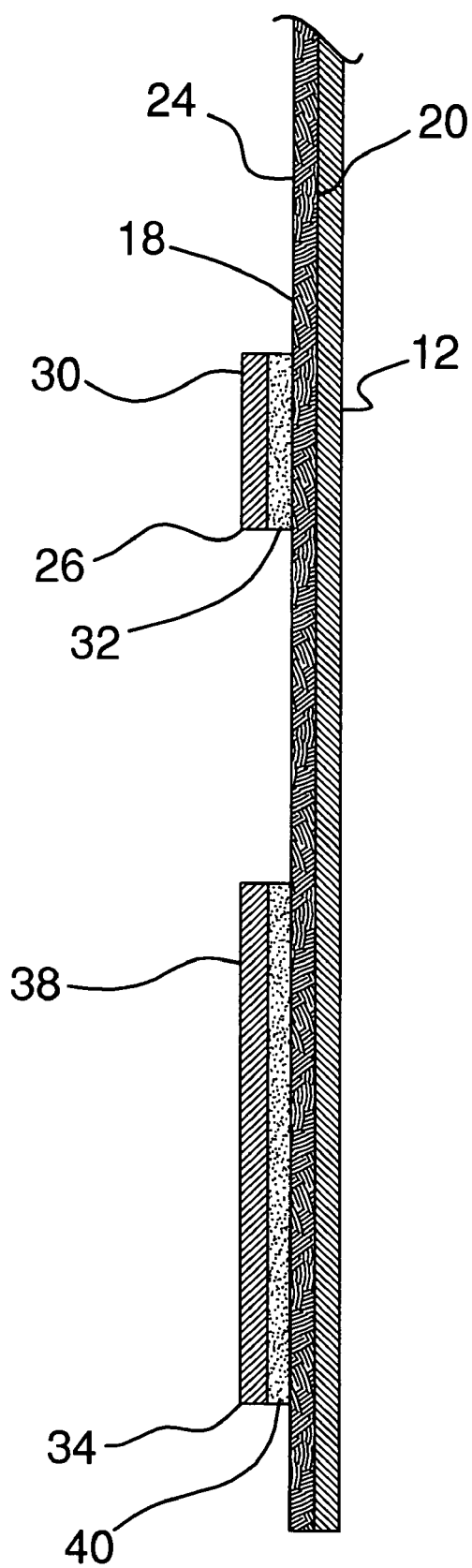
FIG. 3 is a cross-sectional view of the present invention taken along line 3-3 of FIG. 1.
Figure 4:
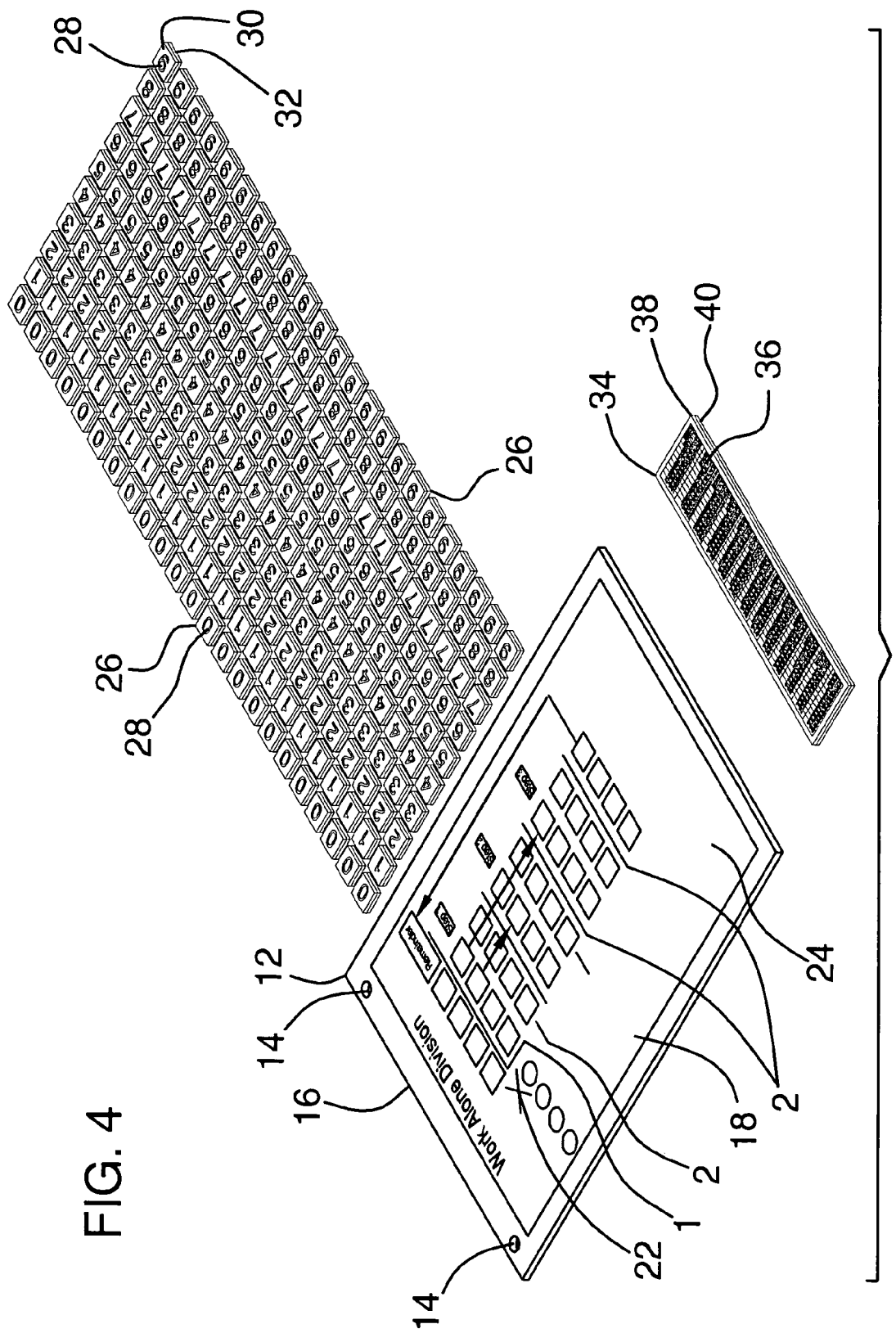
FIG. 4 is an exploded perspective view of the present invention.
Figure 5:
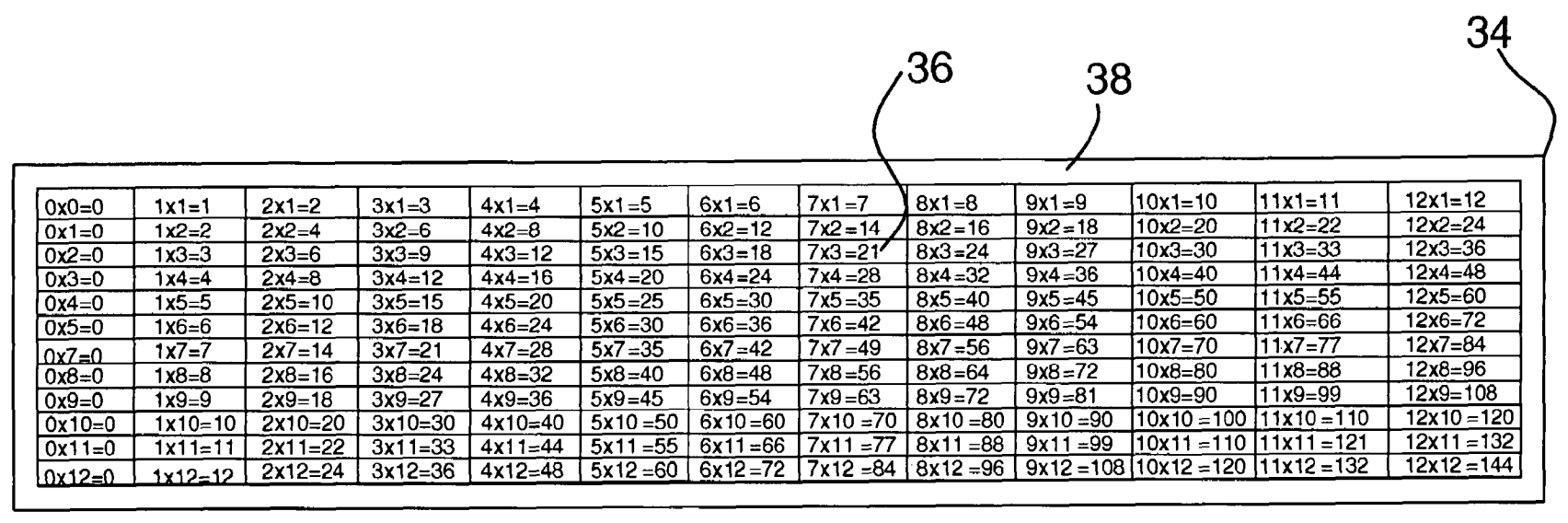
Figure 6:
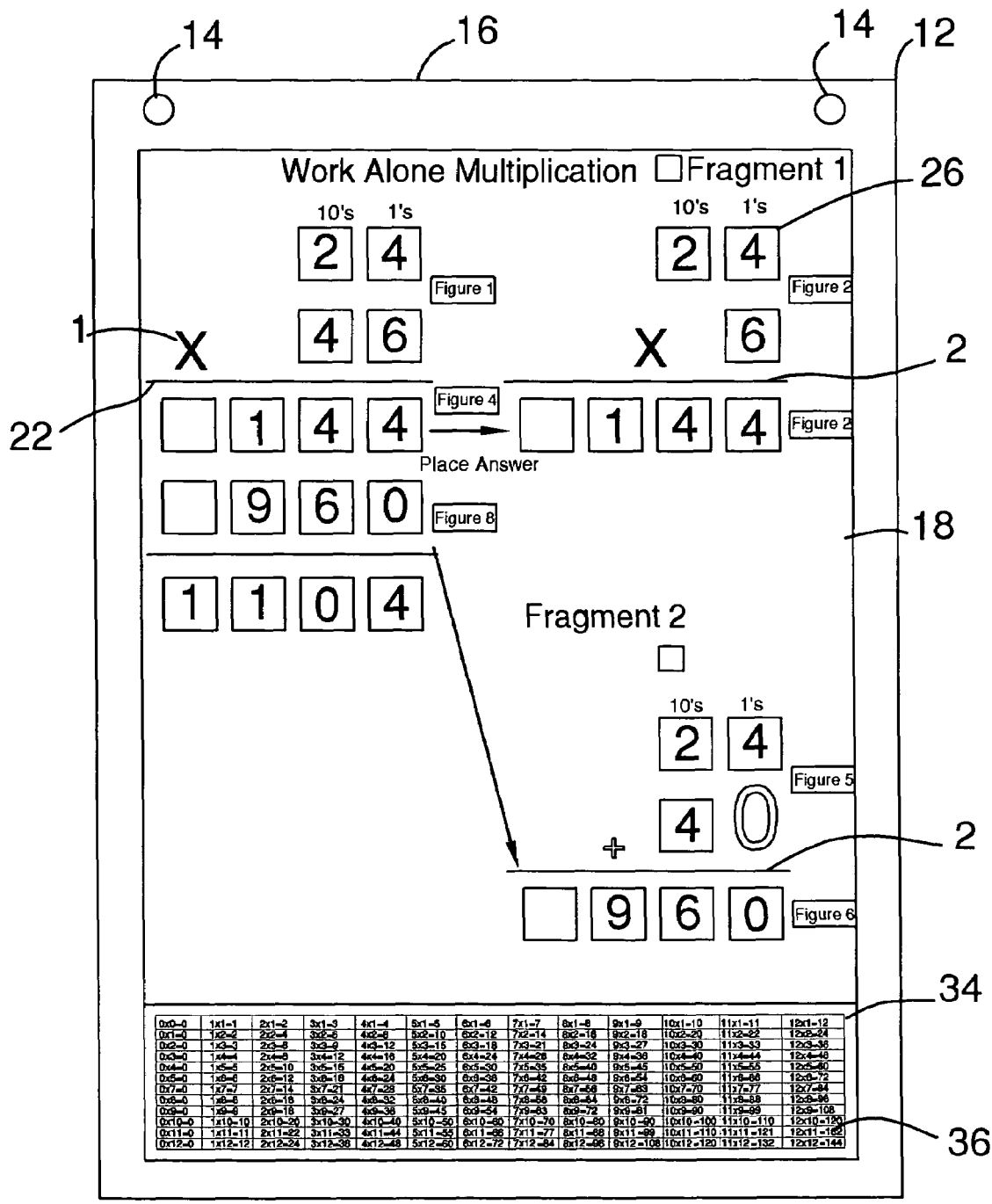
FIG. 6 is an enlarged front view of the present invention shown in use.

With reference now to the drawings, and in particular to FIGS. 1 through 6 thereof, a new math game embodying the principles and concepts of the present invention and generally designated by the reference numeral 10 will be described.

As best illustrated in FIGS. 1 through 6, the math teaching system 10 generally comprises a base panel 12 being mountable to a support surface. The base panel 12 has a pair of apertures 14 extending therethrough. Each of the apertures 14 is positioned adjacent to a top edge 16 of the base panel 12. A work panel 18 is coupled to an exterior surface 20 of the base panel 12. The work panel 18 has equation indicia 22 positioned on an outer surface 24 of the work panel 18 opposite of the base panel 12. The equation indicia 22 are used to learn to execute and determine an answer to a base equation 1.

Each of a plurality of number tiles 26 has a number indicia 28 positioned on a top surface 30 thereof. The number indicia 28 of each of the number tiles 26 is equal to a single digit number. Each of the number tiles 26 includes a complimentary fastener 32 positioned opposite the number indicia 28. The complimentary fastener 32 is complimentary to the work panel 18 to allow the number tiles 26 to be removably mounted to the work panel 18 to form part of the equation.

A table panel 34 is mountable to the work panel 18 opposite the base panel 12. The table panel 34 has multiplication table indicia 36 positioned on an upper surface 38 thereof. The multiplication table indicia 36 indicate a multiplication table through a desired range. The table panel 34 includes a mounting fastener 40 positioned opposite the multiplication table indicia 36. The mounting fastener 40 is complimentary to the work panel 18 to permit selectively mounting of the table panel 34 to the work panel 18.

In use, a portion of the number tiles 26 are placed onto the equation indicia 22 of the work panel 18 to form the base equation 1. The base equation 1 is then divided into component equations 2 by the equation indicia 22. A portion of the number tiles 26 are placed onto the equation indicia 22 to represent the component equations 2. Each of the component equations 2 is solved. A portion of the number tiles 26 are placed onto the equation indicia 22 to represent the answer to the component equations 2. A portion of the number tiles 26 are placed onto the equation indicia 22 of the base equation 1 to represent the answers of the component equations 2. The answers from the component equations 2 are then used to answer the base equation 1. A portion of the number tiles 26 are placed onto the equation indicia 22 to represent the answer to the base equation 1. It should be understood that by "a portion" is meant those number tiles 26 selected by a user of the system.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A math teaching system for assisting in teaching multiplication and division of numbers, said system comprising:
    a base panel being mountable to a support surface;
    a work panel being coupled to an exterior surface of said base panel, said work panel having equation indicia positioned on an outer surface of said work panel opposite of said base panel, said equation indicia being used to learn to execute and determine an answer to a base equation;
    a plurality of number tiles, each of said number tiles having a number indicia positioned on a top surface thereof, said number indicia of each of said number tiles being equal to a single digit number, each of said tiles being positionable on said equation indicia of said work panel; and
    a table panel being mountable to said work panel opposite said base panel, said table panel having multiplication table indicia positioned on an upper surface thereof, said multiplication table indicia indicating a multiplication table through a desired range.

2. The system according to claim 1, wherein said base panel has a pair of apertures extending therethrough, each of said apertures being positioned adjacent to a top edge of said base panel.

3. The system according to claim 1, wherein each of said number tiles includes a complimentary fastener being positioned opposite said number indicia, said complimentary fastener being complimentary to said work panel to allow said number tiles to be removably mounted to said work panel to form part of the equation.

4. The system according to claim 1, wherein said table panel includes a mounting fastener being positioned opposite said multiplication table indicia, said mounting fastener being complimentary to said work panel to permit selectively mounting of said table panel to said work panel.

5. A math teaching system for assisting in teaching multiplication and division of numbers, said system comprising:
    a base panel being mountable to a support surface, said base panel having a pair of apertures extending therethrough, each of said apertures being positioned adjacent to a top edge of said base panel;
    a work panel being coupled to an exterior surface of said base panel, said work panel having equation indicia positioned on an outer surface of said work panel opposite of said base panel, said equation indicia being used to learn to execute and determine an answer to a base equation;
    a plurality of number tiles, each of said number tiles having a number indicia positioned on a top surface thereof, said number indicia of each of said number tiles being equal to a single digit number, each of said number tiles including a complimentary fastener being positioned opposite said number indicia, said complimentary fastener being complimentary to said work panel to allow said number tiles to be removably mounted to said work panel to form part of the equation; and
    a table panel being mountable to said work panel opposite said base panel, said table panel having multiplication table indicia positioned on an upper surface thereof, said multiplication table indicia indicating a multiplication table through a desired range, said table panel including a mounting fastener being positioned opposite said multiplication table indicia, said mounting fastener being complimentary to said work panel to permit selectively mounting of said table panel to said work panel.

6. A method of using a math teaching system comprising:
    providing a math teaching system, said math teaching system comprising:
        a base panel being mountable to a support surface, said base panel having a pair of apertures extending therethrough, each of said apertures being positioned adjacent to a top edge of said base panel;
        a work panel being coupled to an exterior surface of said base panel, said work panel having equation indicia positioned on an outer surface of said work panel opposite of said base panel, said equation indicia being used to learn to execute and determine an answer to a base equation;
    a plurality of number tiles, each of said number tiles having a number indicia positioned on a top surface thereof, said number indicia of each of said number tiles being equal to a single digit number, each of said number tiles including a complimentary fastener being positioned opposite said number indicia, said complimentary fastener being complimentary to said work panel to allow said number tiles to be removably mounted to said work panel to form part of the equation; and
    a table panel being mountable to said work panel opposite said base panel, said table panel having multiplication table indicia positioned on an upper surface thereof, said multiplication table indicia indicating a multiplication table through a desired range, said table panel including a mounting fastener being positioned opposite said multiplication table indicia, said mounting fastener being complimentary to said work panel to permit selectively mounting of said table panel to said work panel;
    placing a portion of said number tiles onto said equation indicia of said work panel to form the base equation;
    dividing of the base equation into component equations by said equation indicia;
    placing a portion of said number tiles onto said equation indicia to represent the component equations;
    solving of the component equations;
    placing a portion of said number tiles onto said equation indicia to represent the answer to said component equations;
    placing a portion of said number tiles onto said equation indicia of the base equation to represent the answers of the component equations;
    using of the answers from the component equations to answer the base equation; and
    placing a portion of said number tiles onto said equation indicia to represent the answer to the base equation.

* * * * *